US008982878B1

(12) United States Patent
Johnson et al.

(10) Patent No.: US 8,982,878 B1
(45) Date of Patent: Mar. 17, 2015

(54) CENTRALIZED CIRCUIT SWITCH PROVISIONING SYSTEM

(71) Applicant: Sprint Communications Company L.P., Overland Park, KS (US)

(72) Inventors: Anthony E. Johnson, Lee's Summit, MO (US); Patrick G. Keating, Overland Park, KS (US); Maria G. Giron Morales, Overland Park, KS (US); Peter Mpinga, Kansas City, MO (US); Joseph M. Murray, Trimble, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 202 days.

(21) Appl. No.: 13/769,267

(22) Filed: Feb. 15, 2013

(51) Int. Cl.
*H04L 12/50* (2006.01)
*H04L 12/933* (2013.01)
*H04L 12/24* (2006.01)
*H04L 12/26* (2006.01)

(52) U.S. Cl.
CPC ............ *H04L 49/10* (2013.01); *H04L 12/50* (2013.01); *H04L 41/0686* (2013.01); *H04L 43/10* (2013.01)
USPC ........................ 370/360; 709/221; 718/102

(58) Field of Classification Search
None
See application file for complete search history.

(56) References Cited

U.S. PATENT DOCUMENTS

| 2010/0095306 | A1* | 4/2010 | Gomyo et al. | 718/107 |
| 2011/0066296 | A1* | 3/2011 | Nelson et al. | 700/286 |
| 2011/0093854 | A1* | 4/2011 | Blanc et al. | 718/101 |
| 2011/0176539 | A1* | 7/2011 | Cao | 370/352 |

\* cited by examiner

*Primary Examiner* — Timothy J Weidner

(57) ABSTRACT

A method of reconfiguring a provisioning system. The method comprises sending a reload command to a controller component that identifies one of a plurality of circuit switches which the provisioning system is configured to provision; sending by the controller component the reload command to a plurality of commander components associated with the circuit switch identified in the reload command; the commander components associated with the circuit switch identified in the reload command sending a stop command to each of an at least one connection thread launched by the commander component; terminating by the commander components the at least one connection thread; reading a modified configuration file by each of the commander components associated with the circuit switch identified in the reload command; and launching at least one connection thread by each commander component associated with the circuit switch identified in the reload command based on the modified configuration file.

12 Claims, 7 Drawing Sheets

CENTRALIZED CIRCUIT SWITCH PROVISIONING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Circuit switches connect communication channels and provide exclusive use of the connections. For example, a circuit switch that connects a first voice terminal to a second voice terminal excludes any other terminals from accessing and using that connection. The connections provided by circuit switches may carry voice content or data content. Circuit switches may be provisioned by entering data into data base tables and/or tables stored in a memory of the circuit switch, for example in volatile memory, in non-volatile memory, and/or in secondary memory storage, for example on a disk drive. The provisioning of circuit switches may define how to route calls and define operational parameters. Examples of circuit switches include the Alcatel-Lucent 5ESS switch, the Nortel DMS-250 switch, and the Samsung SDX-100 switch, but it is understood that there are a large number of other known circuit switches.

SUMMARY

In an embodiment, a method of reconfiguring a provisioning system is disclosed. The method comprises sending by a user interface of the provisioning system a reload command to a controller component of the provisioning system, wherein the reload command identifies one of a plurality of circuit switches which the provisioning system is configured to provision and in response to receiving the reload command, sending by the controller component the reload command to a plurality of commander components of the provisioning system that are associated with the circuit switch identified in the reload command. The method further comprises, in response to the reload command, each of the commander components associated with the circuit switch identified in the reload command sending a stop command to each of an at least one connection thread launched by the commander component and in response to the stop command, each of the at least one connection thread completing an in-progress command. If the in-progress command is dependently associated with another command that the at least one connection thread has not completed, the method further comprises sending a notification to the commander component associated with the at least one connection thread indicating that the uncompleted command automatically failed. The method further comprises sending by the commander components indications of automatically failed commands to a circuit switch provisioning front-end and terminating by the commander components the at least one connection thread. The method further comprises, after terminating connection threads, reading a modified configuration file by each of the commander components associated with the circuit switch identified in the reload command and launching at least one connection thread by each commander component associated with the circuit switch identified in the reload command based on the modified configuration file, whereby at least a portion of the provisioning system is reconfigured.

In an embodiment, a method of operating a provisioning system in a hold state is disclosed. The method comprises sending by a user interface of the provisioning system a hold command to a controller component of the provisioning system, wherein the hold command identifies one of a plurality of circuit switches which the provisioning system is configured to provision and in response to receiving the hold command, the controller component sending the hold command to each of a plurality of commander components of the provisioning system that are associated with the circuit switch identified in the hold command. The method further comprises in response to receiving the hold command, discontinuing processing commands from a command data store by each of the plurality of commander components associated with the circuit switch identified in the hold command, wherein the command data store comprises commands for provisioning circuit switches and in response to receiving a hold release command, resuming processing commands from the command data store by each of the plurality of commander components associated with the circuit switch identified in the hold command, wherein during a hold state provisioning commands associated with the circuit switch identified in the hold command are queued for later processing.

In an embodiment, a centralized circuit switch provisioning system is disclosed. The system comprises a messaging system, a provisioning command data store, a plurality of request consumer components, a plurality of reply producers, and a plurality of thread management components. The messaging system comprises a plurality of provisioning request queues and plurality of reply queues, wherein the provisioning request queues store messages identifying a circuit switch provisioning request, wherein the reply queues store messages identifying replies to circuit switch provisioning requests, and wherein the messaging system is provided by a first computer system. The plurality of request consumer components retrieve messages from the provisioning request queues and store them in the provisioning command data store. The plurality of reply producers create replies to circuit switch provisioning requests and send those replies to the plurality of reply queues. Each thread management component is associated with a single circuit switch, and at least three thread management components are associated with each of a plurality of circuit switches, wherein each of the three thread management components supports different provisioning functions, wherein each thread management component retrieves provisioning commands from the provisioning command data store and assigns the provisioning commands to thread components that interact with a circuit switch to accomplish the requested provisioning and that return results information to its thread management component. The plurality of request consumer components, the plurality of reply producer components, and the plurality of thread management components execute on a second computer system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
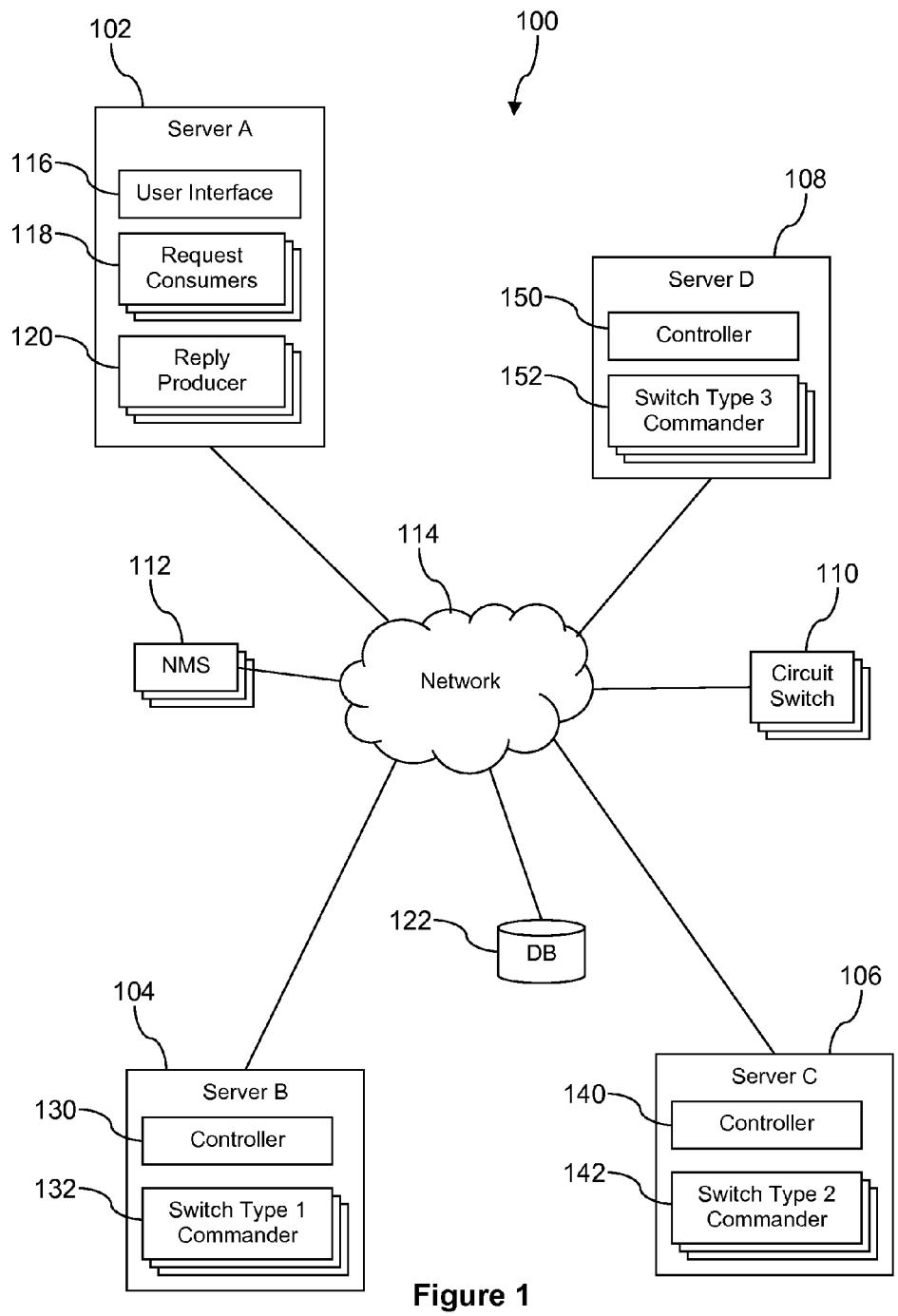
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communication service provider company may deploy a communication network infrastructure over an extended period of time, adding new equipment and decommissioning old equipment as communication needs change over time. The communication network infrastructure may comprise a wide variety of equipment located in many physically separated places, and the equipment may be made by a number of different equipment vendors. In some cases, a communication service provider may find that they have two or more different systems for provisioning and managing network infrastructure such as circuit switches or other communication equipment. As an example, equipment administrators responsible for provisioning and administering circuit switches may use a first network management system to provision and administer a first brand of circuit switches provided by a first circuit switch manufacturer and use a second network management system to provision and administer a second brand of circuit switches provided by a second circuit switch manufacturer.

The present disclosure teaches a centralized circuit switch provisioning system that provides for adding new equipment from different vendors without re-architecting the system. The system further supports new functionality that may increase the utility of the system. While the descriptions below refer to provisioning circuit switches, in some embodiments the system promotes provisioning other communication equipment in addition to or instead of circuit switches. One of ordinary skill in the art understands what provisioning circuit switches means, for example but not exclusively, changing and/or adding to data tables to build a new IMS trunk or a new wireless trunk, to define call routing, and to define service functionality.

In an embodiment, the system comprises a messaging layer that receives requests from two or more network management systems and queues them for retrieval by an element management layer. The element management layer sends replies corresponding to the requests to the messaging layer, and the messaging layer queues the replies for retrieval by the appropriate network management systems. The element management layer interfaces to network elements, for example circuit switches and/or other network communication nodes, and performs provisioning and element management functions initiated by the network management systems and/or initiated by a user interface provided by the element management layer. A controller component manages a plurality of switch commander components, each switch commander component being associated exclusively to one circuit switch or other network node. Each switch commander component launches and manages one or more element connection threads. Each element connection thread is provided with provisioning commands by its corresponding switch commander and fulfills those commands by interacting with the circuit switch or other network node, for example writing into a data table of the circuit switch.

The switch commanders retrieve provisioning requests and/or provisioning commands from a data store. The provisioning requests and/or provisioning commands are entered into the data store by request consumers that retrieve provisioning requests from the messaging layer. Provisioning requests may be satisfied by performing a single command on a circuit switch or by performing a plurality of commands on a circuit switch. Some commands may depend on being executed in a specific sequence. For example, command A may be required to execute before command B, and command B may be required to execute before command C. Such commands are referred to herein as dependent commands. Dependent commands that depend on each other are assigned by the subject switch commander to the same element connection thread to be executed in the needed order.

The controller component maintains control over the element management layer by controlling the switch commander components. The controller component may command one or more switch commander components associated with a circuit switch or other network element to reload a configuration file stored in the data store. This reloading operation entails terminating all element connection threads managed by the subject switch commander component, reading the appropriate configuration file from the data store, and restarting and/or launching element connection threads based on the configuration file just read. Such reloading provides a way to update the behavior of the element management layer dynamically, without taking down circuit switches or other network elements. As will be discussed in further detail below, the reloading operation informs an originator when its provisioning request has automatically failed, for example in the case that a sequence of dependent commands defined by the provisioning request was interrupted and was unable to complete due to the reload command. Changed configuration files may indicate to the switch commanders to launch either more or fewer element connection threads. Changed configuration files may define changed internet protocol (IP) addresses, change a user name, change a password, and other changes.

The controller component provides a means for a user to set the managed element state of a circuit switch and/or a network node. For example, the controller component may set the managed element state of a circuit switch to a hold state, a lockout state, a scheduled outage state, an active state, and an inactive state. As used here, the term managed element refers to the abstraction of a network node or network element as viewed from the centralized provisioning system and/or the element management layer. When a circuit switch is in the managed element hold state, the element management layer stacks or queues provisioning requests directed to the subject switch. The stacked provisioning requests are serviced when the subject circuit switch is released from the hold state and returned to the active state. When entering the hold state at the command of the controller component, a switch commander commands each of its element connection threads to finish the in-progress command. Any dependent commands linked to the last finished in-progress command are failed back to the subject network management systems.

Turning now to FIG. 1, a communication system 100 is described. In an embodiment, the system 100 comprises a first server 102, a second server 104, a third server 106, and a fourth server 108. The first server 102 may be referred to as server A, the second server 104 may be referred to as server B, the third server 106 may be referred to as server C, and the fourth server 108 may be referred to as server D. It is understood that in other embodiments, the system 100 may comprise more or fewer servers; that a first functionality described as performed by one of the servers and a second functionality described as performed by a different one of the servers may be instead performed by one of the servers; that a functionality described as performed by one of the servers may be divided and performed by two or more of the servers. In combination with the present disclosure, one of ordinary skill in the art may readily determine how many servers to use to deploy the centralized circuit switch provisioning system based on balancing considerations of ease of maintenance, cost of different server models, and architecture of the circuit switch and network infrastructure to be provisioned and/or managed. The system 100 further comprises a data store 122.

The communication system 100 comprises a plurality of circuit switches 110 and/or other network elements to be provisioned and/or managed. It is understood that the circuit switches 110 may comprise equipment manufactured by different equipment vendors. For example, in an embodiment, the circuit switches 110 may comprise circuit switches manufactured by Alcatel-Lucent, circuit switches manufactured by Ericsson, and/or circuit switches manufactured by Samsung. In an embodiment, the system 100 may comprise more than 500 circuit switches and/or other network elements and may perform thousands of provisioning requests per day. Hereinafter the circuit switches 110 may be referred to simply as switches 110. It is understood, however, that while the descriptions herein refer primarily to circuit switches 110, the present disclosure contemplates that the centralized provisioning system taught herein may be used to provision and/or manage other network elements in addition to or instead of circuit switches.

The communication system 100 further comprises one or more network management system (NMS) 112. The network management system 112 may provide a user interface and abstracted commands that a user may employ to provision and/or control the circuit switches 110 and/or other network nodes. In an embodiment, the communication system 100 comprises a first network management system 112 to provision and/or control the circuit switches 110 associated with a first vendor or a first original equipment manufacturer (OEM) and a second network management system 112 to provision and/or control the circuit switches 110 associated with a second vendor and the circuit switches 110 associated with a third vendor. While the network management system 112 may be used to provision the circuit switches 110 and/or other network nodes, it is understood that local interfaces and/or "backdoor" consoles may be used to perform some provisioning and/or maintenance actions on individual circuit switches 110 and/or other network nodes of the system 100.

The servers 102, 104, 106, 108, the circuit switches 110, and the network management system 112 are communicatively coupled via a network 114 that comprises one or more public networks, one or more private networks, or a combination thereof. It is understood that the circuit switches 110 may be abstracted as part of the network 114, but they are drawn separate from the network 114 in FIG. 1 to promote ease of discussion of the functionality of the system 100. Likewise, the network management system 112 may be abstracted as part of the network 114.

In an embodiment, the first server 102 comprises a user interface 116, a plurality of provisioning request consumers 118, and a plurality of reply producers 120. In an embodiment, the user interface 116, the request consumers 118, and the reply producers 120 may be implemented as software components, software processes, and/or software threads that execute on the first server 102. The user interface 116 may be used to send commands to the centralized provisioning system components of servers 104, 106, 108. In an embodiment, the second server 104 comprises a first controller 130 and at least one switch type 1 commander component 132; the third server 106 comprises a second controller 140 and at least one switch type 2 commander component 142; and the fourth server 108 comprises a third controller 150 and at least one switch type 3 commander component 152. In an embodiment, the controllers 130, 140, 150 and the switch commanders 132, 142, 152 may be implemented as software components, software processes, and/or software threads.

Figure 2:
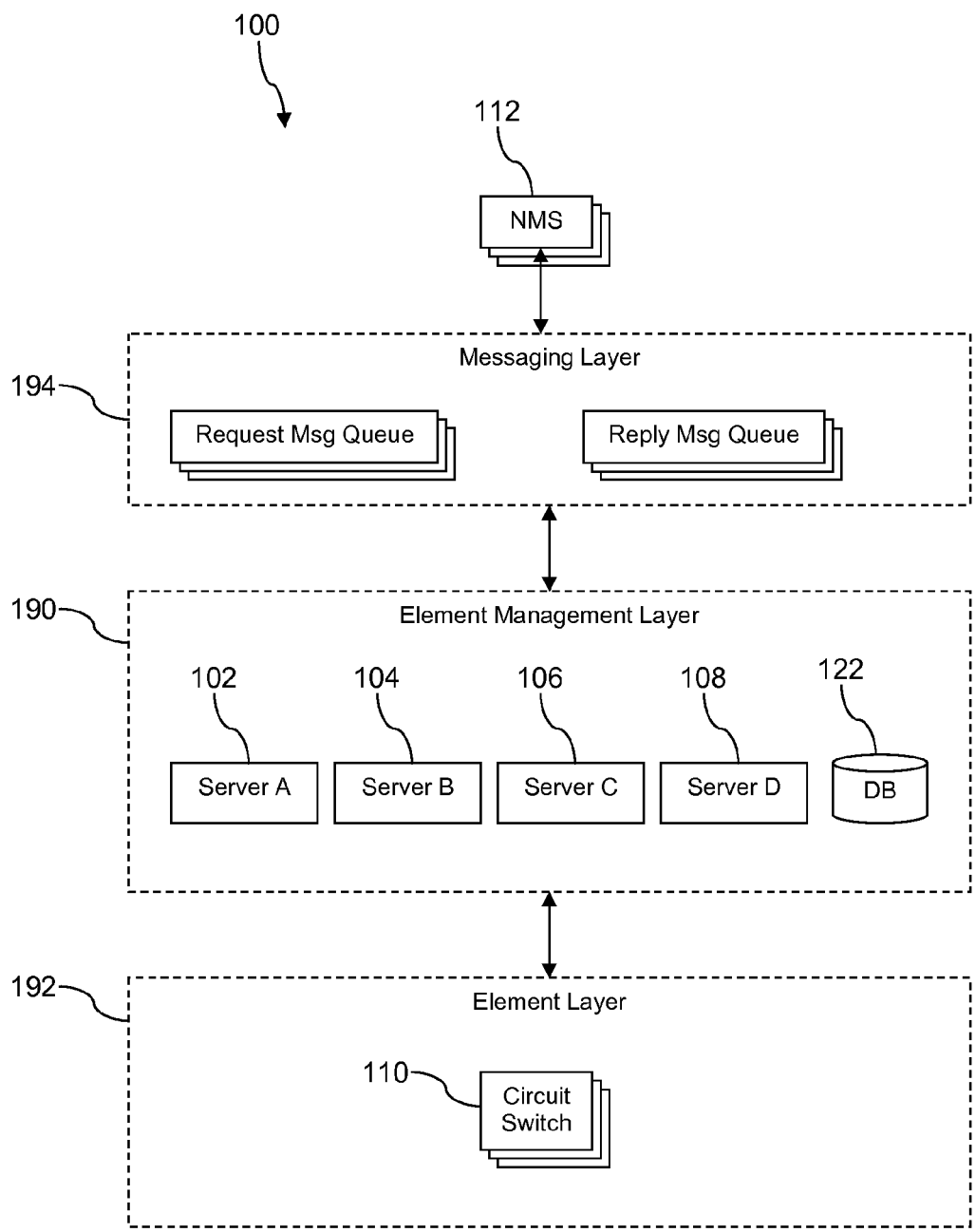
FIG. 2 is a block diagram of a communication system according to an embodiment of the disclosure.

Turning now to FIG. 2, further details of an embodiment of the system 100 are described. An embodiment of the system 100 may be abstracted as comprising the one or more network management systems 112, a messaging layer 194, an element management layer 190, and an element layer 192. In some contexts, the messaging layer 194 may be referred to as a message queuing system. In an embodiment, the messaging layer 194 may be provided by a third party vendor. The element management layer 190 may be referred to in some contexts as a centralized provisioning system.

In an exemplary use scenario, a provisioning request may be entered by a user of the network management system 112 and sent by the network management system 112 to the messaging layer 194 where it is stored in a request message queue. The element management layer 190 retrieves the provisioning request from the request message queue and stores it in the data store 122. One of the switch commanders 132, 142, 152 retrieves the provisioning request from the data store 122, for example a switch commander that is associated with a circuit switch 110 identified in the subject provisioning request. The switch commander 132, 142, 152 provides the provisioning request to an element connection thread, and the element connection thread communicates with the subject circuit switch 110 to complete the provisioning. The element connection thread sends a result of the provisioning action to the switch commander 132, 142 152. The switch commander 132, 142, 152 returns the result to the messaging layer 194. Alternatively, the switch commander 132, 142, 152 may return the result to the data store 122, and a reply producer 120 may retrieve the result from the data store 122 and place it on an appropriate reply message queue in the messaging layer 194. The messaging layer 194 stores the result in a reply messaging queue. The network management system 112 retrieves the result from the reply messaging queue and presents the status to the user.

Figure 3:
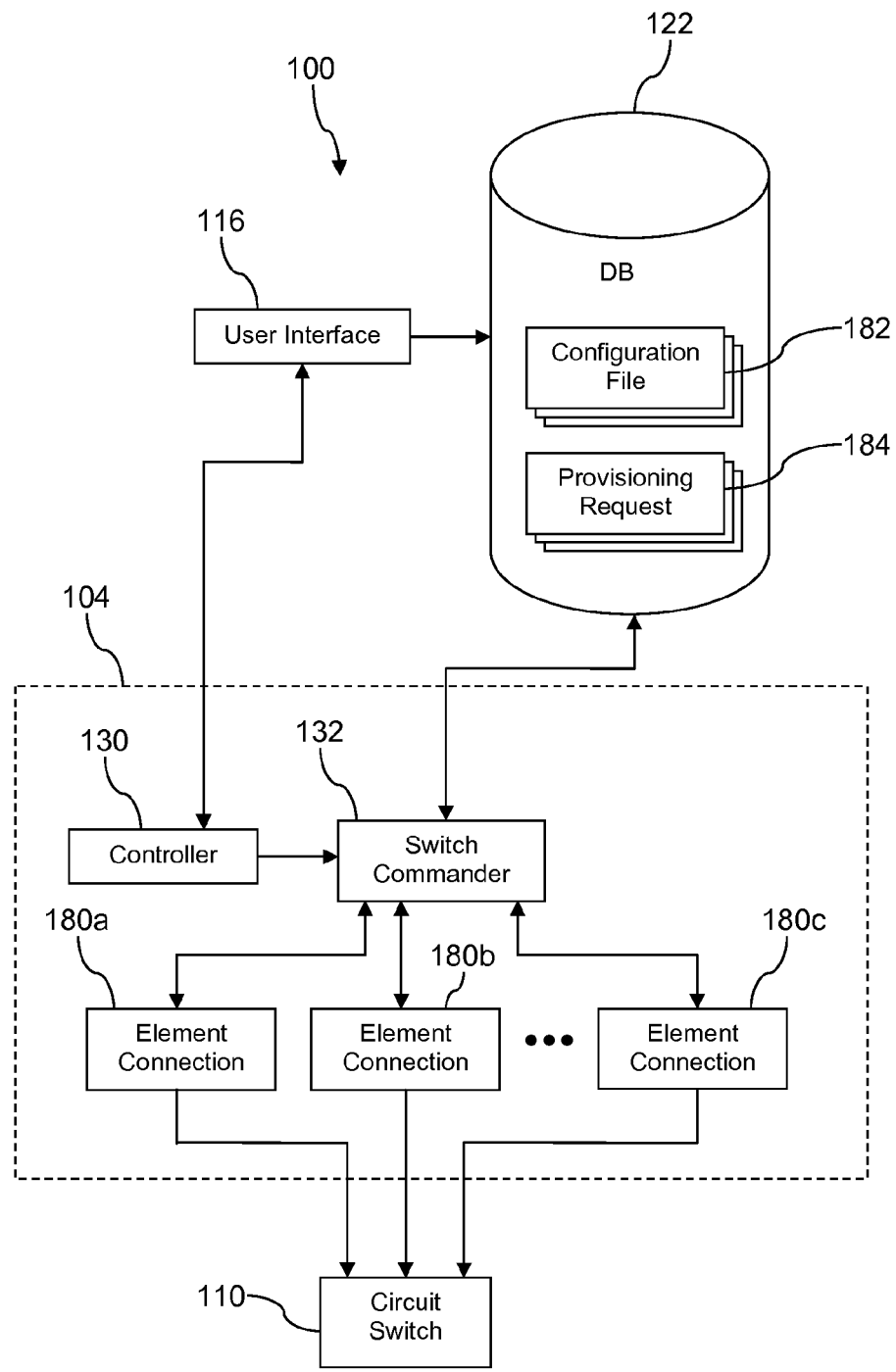
FIG. 3 is a block diagram of a communication system according to an embodiment of the disclosure.

Turning now to FIG. 3, further details of the system 100 are described. In an embodiment, each switch commander 132, 142, 152 is associated with only one of the switches 110. For example, a first switch type 1 commander 132 may be associated with a first one of the switches 110 and is not associated with any other of the switches 110. A second switch type 1 commander 132 may be associated with a second one of the switches 110 and is not associated with any other of the switches 110. A plurality of switch commanders 132, 142, 152 may be associated with the same switch 110. Thus, the association from any single switch commander 132, 142, 152 to a switch 110 is one-to-one; but the association from a switch 110 to switch commanders 132, 142, 152 may be one-to-many.

In an embodiment, the switch type 1 commanders 132 are configured to interwork with switches 110 of a first type; switch type 2 commanders 142 are configured to interwork with switches 110 of a second type; and switch type 3 commanders 152 are configured to interwork with switches of a third type. For example, switch type 1 commanders 132 may be configured to interwork with Nortel switches 110; switch type 2 commanders 142 may be configured to interwork with Alcatel-Lucent switches 110; and switch type 3 commanders 152 may be configured to interwork with Samsung switches 110. The first controller 130 is configured to launch and control a plurality of switch type 1 commanders 132, so as to provision and/or manage switches 110 of the first type. The second controller 140 is configured to launch and control a plurality of switch type 2 commanders 142, so as to provision and/or manage switches 110 of the second type. The third controller 150 is configured to launch and control a plurality of switch type 3 commanders 152, so as to provision and/or management switches 110 of the third type.

The request consumers 118 retrieve request messages from the request message queues of the messaging layer 194 and place them into the data store 122, for example as one or more provisioning requests 184. It is understood that the request messages on the request message queues of the messaging layer 194 may have been sent to the messaging layer 194 by a network management system 112. A switch commander, for example one of the switch type 1 commanders 132, accesses the data store 122 and retrieves a provisioning request 184, where the subject provisioning request is directed to the circuit switch 110 associated with the particular one of the switch type 1 commanders 132. The switch type 1 commander 132 has launched and supervises one or more element connection threads 180, for example a first element connection thread 180a, a second element connection thread 180b, and a third element connection thread 180c. Element connection threads 180 may support communication with the circuit switches 110 via any of a plurality of different interfaces and may be configured to be readily extended to accommodate new switch interfaces, for example by changing a flag in the configuration file 182.

The switch type 1 commander 132 formats or parses the provisioning request 184 as one or more commands and assigns the one or more commands to be carried out by the element connection threads 180. A provisioning request 184 that parses into two or more commands may be referred to in some contexts as encapsulating bundled commands. In some contexts the provisioning requests 184 may also be referred to as units of work.

The commands represent provisioning actions or management actions to be performed on the circuit switch 110 to which the switch type 1 commander 132 and to which the element connection threads 180 associate. Some provisioning requests 184 and/or units of work may be parsed into two or more independent commands. Independent commands may be assigned by the switch type 1 commander 132 to different element connection threads 180, for example in a manner so as to balance the load on the element connection threads 180 and/or to complete provisioning requests promptly. For example, a provisioning request 184 may be parsed into a first independent command and a second independent command by the switch type 1 commander 132; the switch type 1 commander 132 may assign the first independent command to the first element connection thread 180a; and the switch type 1 commander 132 may assign the second independent command to the second element connection thread 180b. Alternatively, the switch type 1 commander 132 may assign the first and second independent commands to the same one of the element connection threads 180, for example when others of the element connection threads 180 may be occupied with processing earlier assigned commands.

Other provisioning requests 184 may be parsed by the switch type 1 commander 132 into two or more dependent commands, where the dependent commands may preferably be performed on the switch 110 in a particular order, for example a first dependent command being performed before a second dependent command. The switch type 1 commander 132 assigns dependent commands associated with a single provisioning request 184 to the same one of the element connection threads 180 and in the appropriate sequence, thereby assuring that the commands are performed in the preferred order. When the subject provisioning commands have been completed by the element connection threads 180, a result is returned to the switch type 1 commander 132, and that result may be propagated in any of a variety of ways to the messaging layer 194 and back to the network management system 112 that originated the subject provisioning request 184.

The numbers of switch commanders 132 142, 152 and the numbers of element connection threads 180 that each of the switch commanders 132, 142, 152 launch and manage may be defined by one or more configuration files 182 stored in the data store 122. The user interface 116 may be used to modify one of the configuration files 182, for example to increase the number of switch type 1 commanders 132 associated with a particular switch 110. The user interface 116, after modifying the subject configuration file 182, may send a request to the controller 130 to order the subject switch type 1 commander 132 to reload the configuration file 182. In an embodiment, a reload operation involves the switch type 1 commander 132 halting retrieving additional provisioning requests 184 from the data store 122, allowing in-progress commands to be completed by its element connection threads 180, terminating its element connection threads 180, and then restarting itself or simply terminating itself and relying upon the controller 130 to restart the subject switch type 1 commander 132. When the subject switch type 1 commander 132 launches, it reads its configuration from the subject configuration file 182 and launches element connection threads 180 in accordance with the subject configuration file 182. The subject switch type 1 commander 132 may configure other aspects of its operation and execution based on the subject configuration file 182. During such a reload of a switch commander 132, 142, 152 the switch 110 associated with the subject switch commander 132, 142, 152 remains in service as do others of the switch commanders 132, 142, 152 that may be associated with the same switch 110.

In an embodiment, if a series of dependent commands associated with a single provisioning request 184 are in progress, when one or more subsequent dependent commands remain to be performed after the in-progress dependent command is completed by the subject element connection thread 180, the switch type 1 commander 132 sends a failure message for the subject provisioning request 184 back to the originating network management system 112 indicating what portions of the provisioning request 184 succeeded and what portions automatically failed as a result of the reload command. It is understood that the description of the behavior of the switch type 1 commander 132 above applies in like manner to the switch type 2 commanders 142 and the switch type 3 commanders 152, with appropriate substitutions of the second controller 140 in communication with the switch type 2 commanders 142 and the third controller 150 in communication with the switch type 3 commanders 152.

Some switch commanders 132, 142, 152 may be configured, for example by the configuration file 182, to launch only a single element connection thread 180. Some switch commanders 132, 142, 152 may be associated with provisioning requests 184 directed to a single table of a circuit switch 110, for example a table that may be the subject of relatively frequent provisioning requests 184. The element management layer 190 and/or centralized provisioning system may configure switch commanders 132, 142, 152 and/or element connection threads 180 to prevent some low volume provisioning requests from being starved of processing time in the presence of large volumes of provisioning requests associated with some specific table of a circuit switch 110.

The user interface 116 may be used to control other operational parameters or modes of the centralized provisioning system and/or the element management layer 190. The user interface 116 may be used to identify a scheduled outage of a circuit switch 110, for example a period of time during which the circuit switch 110 may be undergoing a maintenance activity such as a switch load version upgrade. The user interface 116 may be used to dynamically change an internet protocol (IP) address of one or more of the servers 102, 104, 106, 108, the data store 122, or elements of the messaging layer 194. The user interface 116 may be used to dynamically change user names, passwords, configure additional element connection threads 180 managed by a switch commander 132, 142, 152. The user interface 116 may be used to change managed element state of one or more of the circuit switches 110. The user interface 116 may be said to be used for making changes to the element management layers 190 and/or the centralized provisioning system in real-time.

In an embodiment, the element management layer 190 may be able to set the element management state and/or provisioning state of a circuit switch 110 to one of an active state, an inactive state, a hold state, and a scheduled outage state. Note that the element management state and/or provisioning state of the circuit switch 110 is a state not of the circuit switch 110 itself but of the abstraction of the circuit switch 110 as a managed element. When the provisioning state of a circuit switch 110 is inactive or scheduled outage, provisioning requests 184 directed to the subject circuit switch 110 are failed back to the originating network management system 112. The scheduled outage provisioning state of a circuit switch 110 is entered and exited according to a schedule that has been defined using the user interface 116 as described above. The general behavior of the active provisioning state of the circuit switches 110 has been described above.

In a hold provisioning state of a circuit switch 110, provisioning requests 184 are received into the data store 122 and not failed back to the originating network management system 112. These provisioning requests 184 associated with a hold provisioning state may be said to be stacked for later action by the switch commanders 132, 142, 152 associated with the subject circuit switch 110, for example for processing after the provisioning state of the circuit switch 110 is returned to the active state. In some contexts, the different behaviors of the element management layer 190 and/or the centralized provisioning system may be referred to as dynamically adapting user commands based on provisioning state of the subject circuit switch 110.

The user interface 116 in an embodiment allows a user to lock tables associated with one of the circuit switches 110 so as to allow only one user to edit the subject table at one time. If a provisioning request 184 is received that is related to the locked table of the circuit switch 110, the element management layer 190 queues that provisioning request 184 for processing after the lock is released.

Figure 4A:
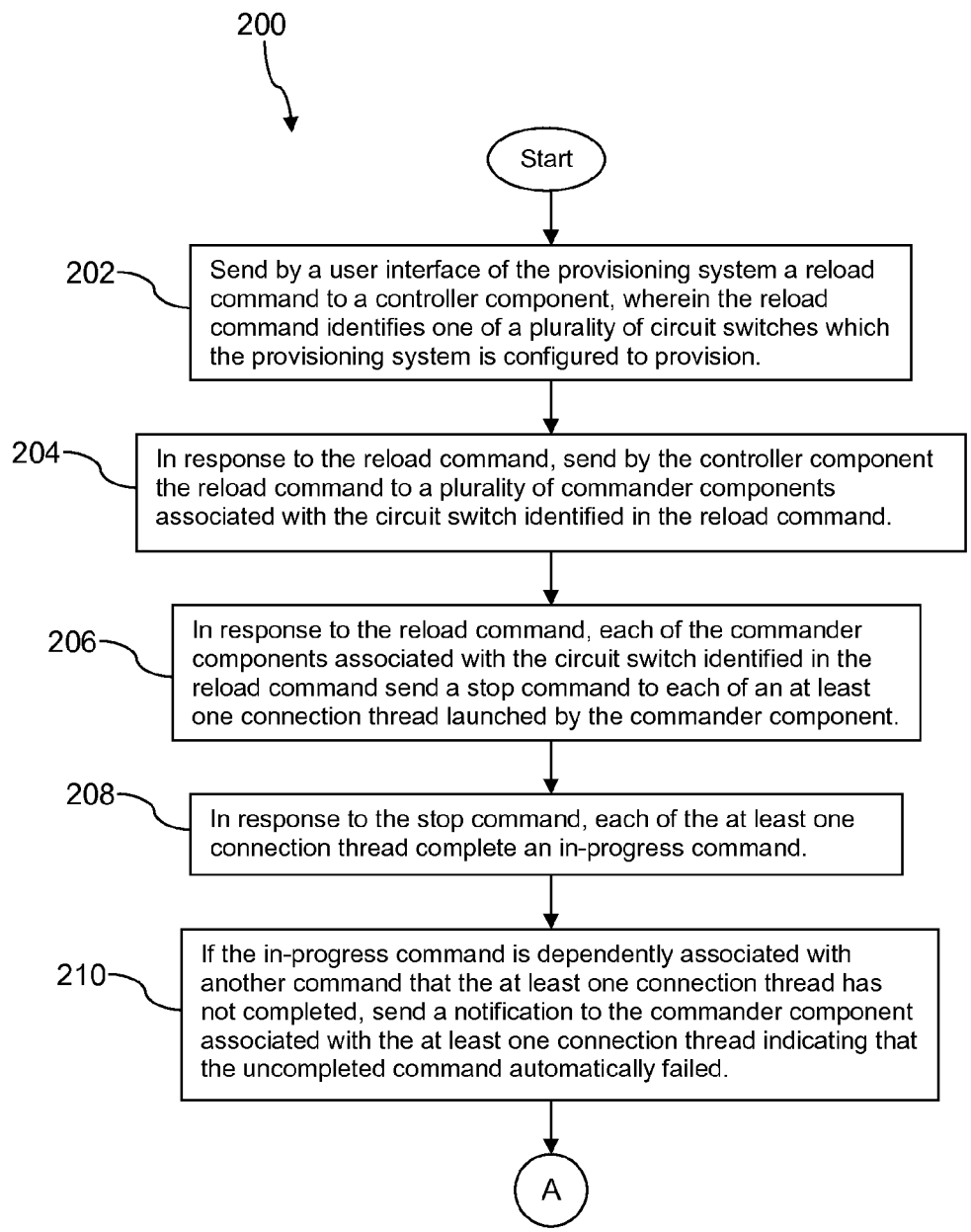
FIG. 4A and FIG. 4B are a flow chart of a method according to an embodiment of the disclosure.
Figure 4B:
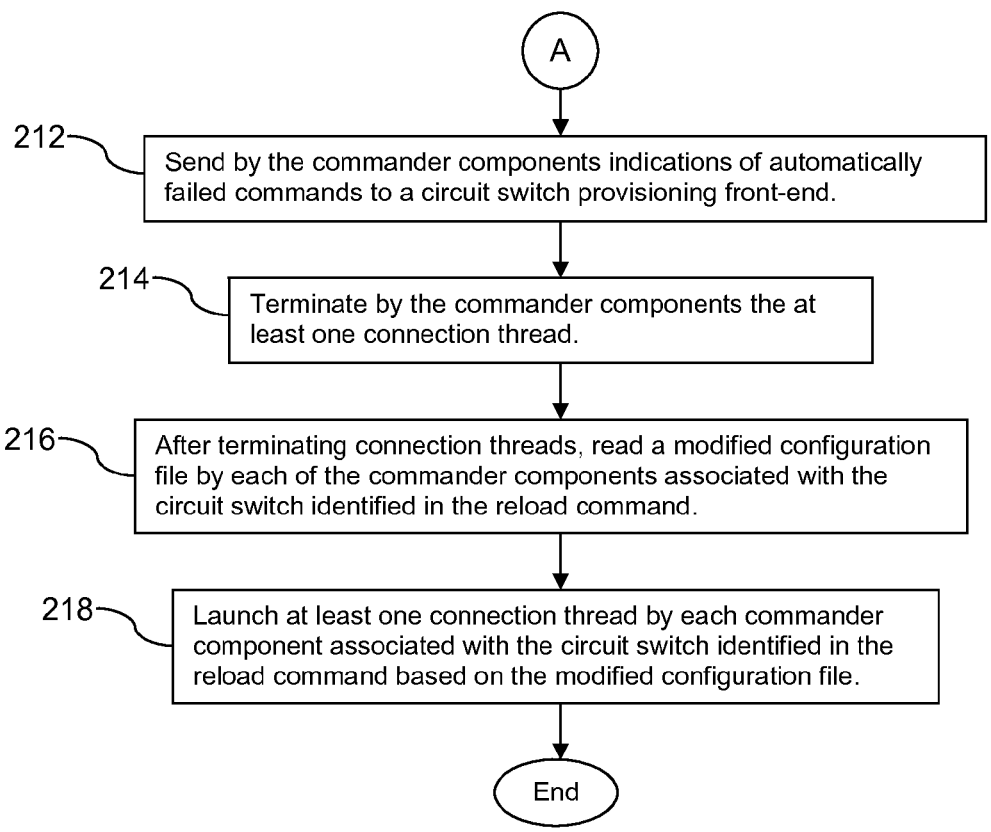

Turning now to FIG. 4A and FIG. 4B, a method 200 is described. At block 202, a user interface of the provisioning system sends or inputs a reload command to a controller component, wherein the reload command identifies one of a plurality of circuit switches which the provisioning system is configured to provision. At block 204. In response to receiving the reload command, the controller component sends the reload command to a plurality of commander components associated with the circuit switch identified in the reload command. For example, the first controller 130 sends a reload command or like command to each of the switch type 1 commanders 132 associated with a particular circuit switch 110. It is understood that the configuration file 182 may have been modified prior to the processing of block 202 and/or block 204.

At block 206, In response to the reload command, each of the commander components associated with the circuit switch identified in the reload command send a stop command to each of an at least one element connection thread launched by the commander component. At block 208, in response to the stop command, each of the at least one connection thread completes an in-progress command. At block 210, if the in-progress command is dependently associated with another command that the at least one element connection thread has not completed, send a notification to the commander component associated with the at least one connection thread indicating that the uncompleted command automatically failed. This notification of automatically failed command may alternatively be generated by the subject commander component. The notification of automatically failed command and/or provisioning request may be propagated back to the network management system 112 that originated the subject provisioning request.

At block 212, the commander components send indications of automatically failed commands to a circuit switch provisioning front-end, for example to one of the network management systems 112. At block 214, the commander components terminate the element connection threads that they launched. At block 216, after terminating the element connection threads, each of the subject commander components or switch commanders associated with the circuit switch 110 identified in the reload command read the configuration file 182, for example a modified configuration file. In an embodiment, the behavior of block 216 happens automatically when the controller 130, 140, 150 terminates and restarts commander components and/or switch commanders 132, 142, 152. At block 218, each of the subject commander components associated with the circuit switch 110 identified in the reload command launches at least one element connection thread, based on the configuration file 182.

Figure 5:
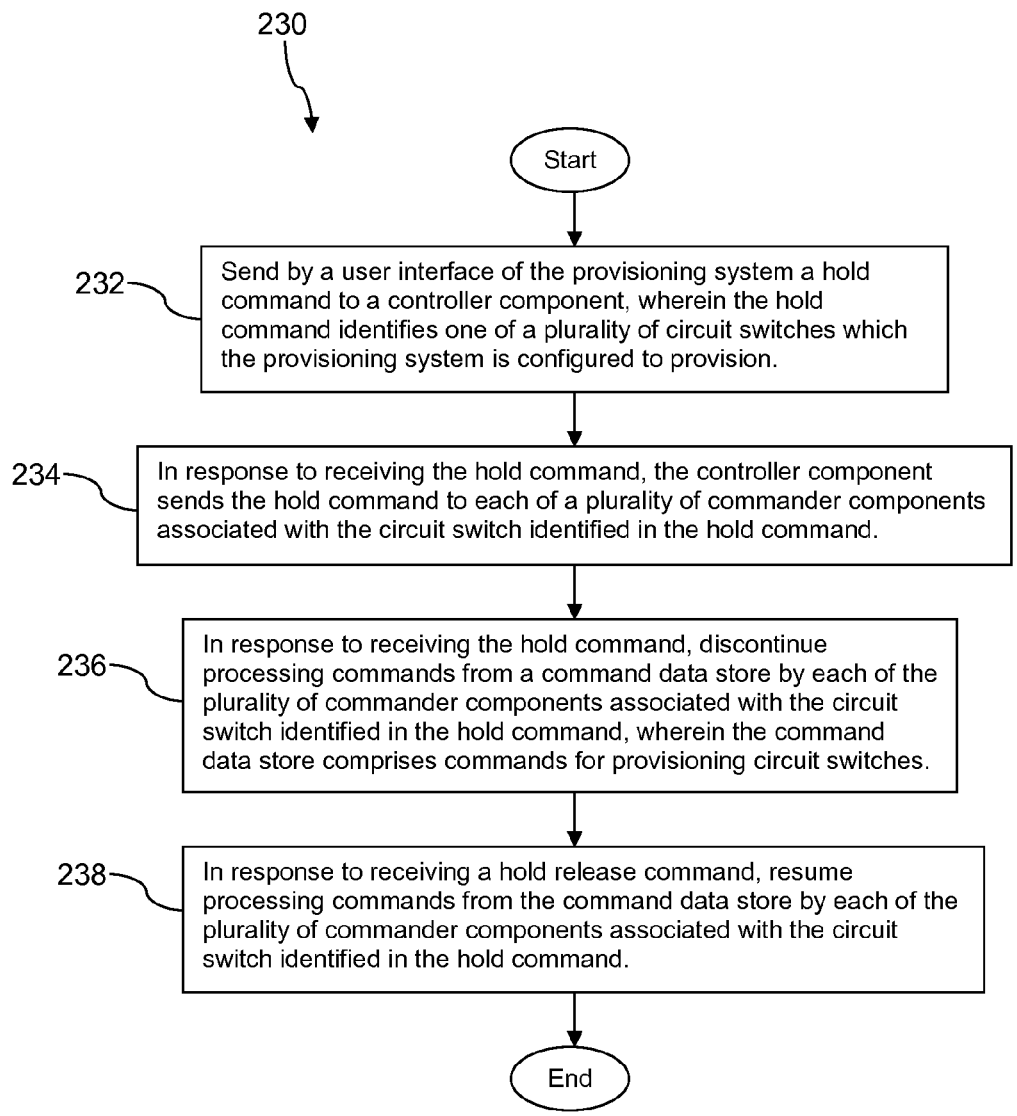
FIG. 5 is a flow chart of a method according to an embodiment of the disclosure.

Turning now to FIG. 5, a method 230 is described. At block 232, a user interface of the provisioning system sends a hold command to a controller component, wherein the hold command identifies one of a plurality of circuit switches which the provisioning system is configured to provision. At block 234, in response to receiving the hold command, the controller component sends the hold command to each of a plurality of commander components associated with the circuit switch identified in the hold command. At block 236, in response to receiving the hold command, discontinue processing commands from a command data store by each of the plurality of commander components associated with the circuit switch identified in the hold command, wherein the command data store comprises commands for provisioning circuit switches. At block 238, in response to receiving a hold release command, each of the plurality of commander components associated with the circuit switch identified in the hold command resume processing provisioning commands from the command data store, for example from the provisioning requests 184 stored in the data store 122.

Figure 6:
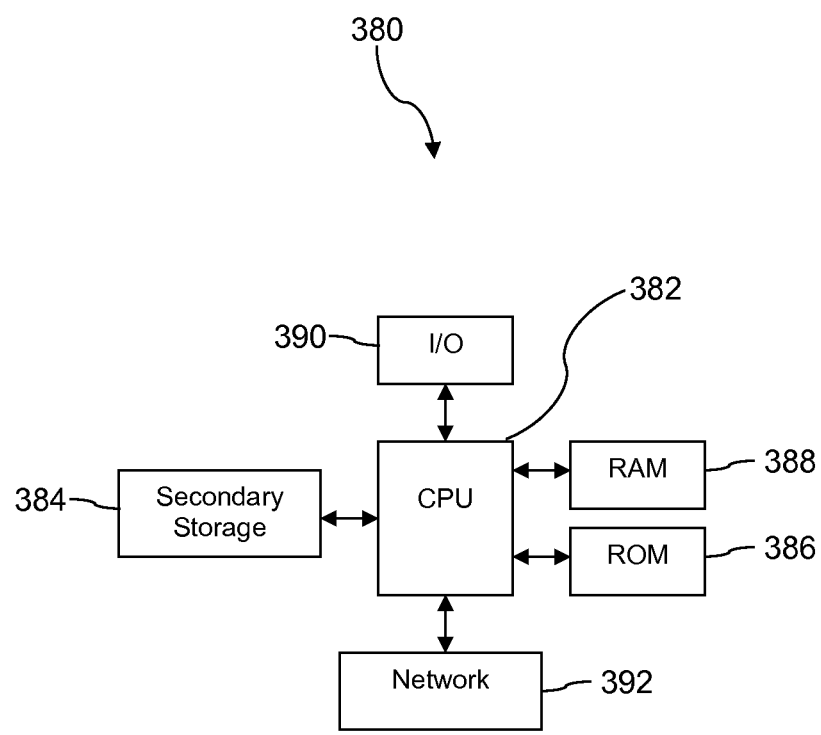
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of reconfiguring a provisioning system, comprising:

sending by a user interface of the provisioning system a reload command to a controller component of the provisioning system, wherein the reload command identifies one of a plurality of circuit switches which the provisioning system is configured to provision;

in response to the reload command, sending by the controller component the reload command to a plurality of commander components of the provisioning system that are associated with the circuit switch identified in the reload command;

in response to the reload command, each of the commander components associated with the circuit switch identified in the reload command sending a stop command to each of an at least one connection thread launched by the commander component;

in response to the stop command, each of the at least one connection thread completing an in-progress command;

if the in-progress command is dependently associated with another command that the at least one connection thread has not completed, sending a notification to the commander component associated with the at least one connection thread indicating that the uncompleted command automatically failed;

sending by the commander components indications of automatically failed commands to a circuit switch provisioning front-end;

terminating by the commander components the at least one connection thread;

after terminating connection threads, reading a modified configuration file by each of the commander components associated with the circuit switch identified in the reload command; and launching one or more connection threads by each commander component associated with the circuit switch identified in the reload command based on the modified configuration file, whereby at least a portion of the provisioning system is reconfigured.

2. The method of claim 1, wherein the modified configuration file changes one of an Internet Protocol (IP) address of the circuit switch identified in the reload command of a number of connection threads launched by one of the command components associated with the circuit switch identified in the reload command.

3. The method of claim 1, wherein commander components associated with the circuit switch identified in the reload command read the modified configuration file from a data store that further stores commands processed by the at least one connection thread launched by the commander components associated with the circuit switch identified in the reload command.

4. The method of claim 1, wherein the reconfiguration is performed without restarting a computer system.

5. The method of claim 1, wherein the plurality of circuit switches which the provisioning system is configured to provision are provided by at least two different circuit switch manufacturers.

6. The method of claim 5, wherein one of the commander components associated with the circuit switch identified in the reload command launches only one connection thread, and wherein the single connection thread launched by the one of the commander components performs provisioning for only one provisioning table associated with the circuit switch identified by the reload command.

7. A provisioning system, comprising:
- a controller component stored in a non-transitory memory of a server that, when executed by at least one processor of the server:
  - receives a reload command from a user interface of the provisioning system, wherein the reload command identifies one of a plurality of circuit switches which the provisioning system is configured to provision; and
  - in response to the reload command, sends the reload command to a plurality of commander components of the provisioning system that are associated with the circuit switch identified in the reload command; and
- the plurality of commander components, each of the plurality of commander components stored in a non-transitory memory of the server, that when executed by at least one processor of the server:
  - in response to the reload command, sends a stop command to each of an at least one connection thread launched by the corresponding commander component, wherein in response to the stop command, each of the at least one connection thread completes an in-progress command, and wherein if the in-progress command is dependently associated with another command that the at least one connection thread has not completed, a notification is sent to the commander component associated with the at least one connection thread indicating that the uncompleted command automatically failed;
  - sends one or more indications of any automatically failed commands to a circuit switch provisioning front-end;
  - terminates the at least one connection thread;
  - after the at least one connection thread is terminated, reads a modified configuration file; and
  - launches one or more connection threads based on the modified configuration file, whereby at least a portion of the provisioning system is reconfigured.

8. The provisioning system of claim 7, wherein the modified configuration file changes one of an Internet Protocol (IP) address of the circuit switch identified in the reload command of a number of connection threads launched by one of the plurality of command components associated with the circuit switch identified in the reload command.

9. The provisioning system of claim 7, wherein each of the plurality of commander components associated with the circuit switch identified in the reload command reads the modified configuration file from a data store that further stores commands processed by the at least one connection thread launched by the corresponding commander component associated with the circuit switch identified in the reload command.

10. The provisioning system of claim 7, wherein the reconfiguration is performed without restarting a computer system.

11. The provisioning system of claim 7, wherein the plurality of circuit switches which the provisioning system is configured to provision are provided by at least two different circuit switch manufacturers.

12. The provisioning system of claim 11, wherein one of the plurality of commander components associated with the circuit switch identified in the reload command launches only one connection thread, and wherein the single connection thread launched by the one of the plurality of commander components performs provisioning for only one provisioning table associated with the circuit switch identified by the reload command.

* * * * *